(12) United States Patent
Shah et al.

(10) Patent No.: US 11,427,739 B2
(45) Date of Patent: Aug. 30, 2022

(54) OPTICALLY CLEAR PRESSURE SENSITIVE ADHESIVES AND USES THEREOF

(71) Applicant: HENKEL AG & CO, KGaA, Duesseldorf (DE)

(72) Inventors: Geetanjaliben Shah, Somerset, NJ (US); Yuxia Liu, Dayton, NJ (US)

(73) Assignee: HENKEL AG & CO, KGaA, Dusseldorf (DE)

( * ) Notice: Subject to any disclaimer, the term of this patent is extended or adjusted under 35 U.S.C. 154(b) by 204 days.

(21) Appl. No.: 16/913,607

(22) Filed: Jun. 26, 2020

(65) Prior Publication Data
US 2020/0325372 A1 Oct. 15, 2020

Related U.S. Application Data

(63) Continuation of application No. PCT/US2018/067468, filed on Dec. 26, 2018.

(60) Provisional application No. 62/610,555, filed on Dec. 27, 2017.

(51) Int. Cl.
| | |
|---|---|
| C09J 183/04 | (2006.01) |
| C09J 153/02 | (2006.01) |
| C08K 3/014 | (2018.01) |
| C08G 77/20 | (2006.01) |

(52) U.S. Cl.
CPC ......... *C09J 183/04* (2013.01); *C09J 153/025* (2013.01); *C08G 77/20* (2013.01); *C08K 3/014* (2018.01); *C09J 2203/318* (2013.01); *C09J 2301/302* (2020.08); *C09J 2301/312* (2020.08); *C09J 2301/416* (2020.08); *C09J 2425/00* (2013.01); *C09J 2453/00* (2013.01); *C09J 2483/00* (2013.01)

(58) Field of Classification Search
CPC ................ C09J 2483/00; C09J 2453/00; C09J 2425/00; C09J 2301/416; C09J 2301/312; C09J 2301/302; C09J 2203/318; C09J 183/04; C09J 153/025; C09J 7/00; C08K 3/014; C08K 5/56; C08K 5/3475; C08K 5/132; C08K 5/3435; C08G 77/20; C08G 77/12; C08L 83/00
See application file for complete search history.

(56) References Cited

U.S. PATENT DOCUMENTS

| | | |
|---|---|---|
| 2,676,182 A | 4/1954 | Daudt et al. |
| 2,814,601 A | 11/1957 | Currie et al. |
| 3,700,633 A | 10/1972 | Wald et al. |
| 4,313,988 A | 2/1982 | Koshar et al. |
| 4,507,187 A | 3/1985 | Jacobine et al. |
| 4,534,838 A | 8/1985 | Lin et al. |
| 4,536,265 A | 8/1985 | Fabrizio et al. |
| 5,171,760 A | 12/1992 | Kaszas et al. |
| 5,300,608 A | 4/1994 | Chu et al. |
| 5,665,823 A | 9/1997 | Saxena et al. |
| 6,140,444 A | 10/2000 | Levandoski et al. |
| 6,187,834 B1 | 2/2001 | Thayer et al. |
| 6,399,805 B2 | 6/2002 | Wolf et al. |
| 6,448,303 B1 | 9/2002 | Paul |
| 7,911,699 B2 | 3/2011 | Wang et al. |
| 8,013,314 B2 | 9/2011 | Levandoski et al. |
| 9,018,304 B2 | 4/2015 | Kim et al. |
| 2002/0026049 A1 | 2/2002 | Wolf et al. |
| 2003/0109599 A1 | 6/2003 | Kamen |
| 2003/0212229 A1 | 11/2003 | Levandoski et al. |
| 2007/0026509 A1 | 2/2007 | Rogers et al. |
| 2010/0168313 A1 | 7/2010 | Mizuno et al. |
| 2013/0224416 A1 | 8/2013 | Cho et al. |
| 2013/0224461 A1 | 8/2013 | Van Der Mee et al. |
| 2013/0321991 A1 | 12/2013 | Lee et al. |
| 2015/0056757 A1 | 2/2015 | Liu et al. |
| 2016/0025965 A1 | 1/2016 | Eguchi |
| 2017/0145267 A1 | 5/2017 | Liu et al. |
| 2017/0247581 A1* | 8/2017 | Zhang ................. C09D 133/08 |

FOREIGN PATENT DOCUMENTS

| | | |
|---|---|---|
| CN | 1349552 A | 5/2002 |
| CN | 1958704 A | 5/2007 |
| CN | 102533132 A | 7/2012 |
| CN | 103333276 A | 10/2013 |
| CN | 106047184 A | 10/2016 |
| CN | 107474753 A | 12/2017 |
| CN | 107474754 A | 12/2017 |
| EP | 1175467 B1 | 6/2006 |

(Continued)

OTHER PUBLICATIONS

Fouassier, Jean-Pierre, "Photoinitiation, Photopolymerization and Photocuring: Fundamentals and Applications," Hanser Publishers, 1995.

(Continued)

*Primary Examiner* — Sanza L. McClendon (74) *Attorney, Agent, or Firm* — Sun Hee Lehmann (57) ABSTRACT

Optically clear adhesives (OCA) with UV blocking below 380 nm are described. The OCA comprise a UV blocking package of UV absorbers and hindered amine light stabilizers. The UV blocking package is suitable for a variety of OCA, including PIB-based OCA, styrenic block copolymer-based OCA, silicone-based OCA, or acrylic-based OCA. The OCA with UV blocking in the invention are particularly suitable as laminating films, tapes or encapsulants for adhering display electronic devices, e.g., LCD displays, LED displays, flexible and foldable displays, and touch screens.

15 Claims, 5 Drawing Sheets

(56) References Cited

FOREIGN PATENT DOCUMENTS

| WO | 0066676 | A1 | 11/2000 |
|---|---|---|---|
| WO | 2004108799 | A1 | 12/2004 |
| WO | 2011053615 | A1 | 5/2011 |
| WO | 2011133408 | A2 | 10/2011 |
| WO | 2012012067 | A1 | 1/2012 |
| WO | 2012085364 | A1 | 6/2012 |
| WO | 2014095724 | A1 | 6/2014 |
| WO | 2016008130 | A1 | 1/2016 |
| WO | 2016025965 | A1 | 2/2016 |
| WO | 2016141546 | A1 | 9/2016 |
| WO | 2016141547 | A1 | 9/2016 |
| WO | 2016173600 | A1 | 11/2016 |
| WO | 2016196460 | A1 | 12/2016 |
| WO | 2017120743 | A1 | 7/2017 |
| WO | 2017159969 | A1 | 9/2017 |

OTHER PUBLICATIONS

Ohshita, J.; Taketsugu, R.; Nakahara, Y.; and Kunai, A. "Convenient synthesis of alkoxyhalosilanes from hydrosilanes" Journal of Organometallic Chemistry, vol. 689, Issue 20, Sep. 29, 2004, pp. 3258-3264.

Kosolapoff, Gennady, M. "A New Synthesis of Phosphinic Acids." Journal of the American Chemical Society, 1950, vol. 72, No. 9, pp. 4292-4293.

Liao, T.P. et al. "New Telechelic Polymers and Sequential Copolymers by Polyfunctional Initiator-Transfer Agents (Inifers)," Polymer Bulletin, Springer-Verlag, vol. 6, No. 3-4, 1981, pp. 135-141.

Boyd, E. Andrew et al. "Facile Synthesis of Functionalised Phenylphosphinic Acid Derivatives" Tetrahedron Letters, vol. 37, No. 10, 1996, pp. 1651-1654.

Huber, A. et al. "Phosphorous-Functionalized Bis(acyl)phophane Oxides for Surface Modification" Angew. Chem. Int. Ed. 2012, 51, pp. 4648-4652. Retrieved from: https://onlinelibrary.wiley.com/doi/epdf/10.1002/anie.201201026.

* cited by examiner

OPTICALLY CLEAR PRESSURE SENSITIVE ADHESIVES AND USES THEREOF

FIELD OF THE INVENTION

The invention relates to optically clear adhesives (OCA) with UV blocking. The optically clear adhesives have a greater than 90% transmission in visible light range and less than 10% in the UV light range. The optically clear adhesives are particularly suitable as laminating films, tapes or encapsulants for adhering electronic devices, e.g., LCD displays, LED displays, flexible and foldable displays, and touch screens.

BACKGROUND OF THE INVENTION

Modern display devices contain organic components that are susceptible to ultraviolet degradation, especially if they are exposed to outdoor environments or in close proximity to fluorescent black lights and/or other short wavelengths. The degradation is seen in the form of color shifts or in washed-out look in the display devices.

The UV radiation is divided into three bands: UV C (below 280 nm), UV B (280-320 nm), and UV A (320-390 nm). To minimize degradation, display devices need protection from all three bands. UV block layers such as cover glass on display devices blocks UV C emissions. To minimize UV B radiation in LCD displays, the displace devices are typically sealed with a UV blocking glass coating. A significant portion of the UV A range (320-390 nm) permeates from the front of an LCD. This UV A degradation is shown in everyday objects when exposed to sunlight for a long time as faded color changes, cracks or disintegrations.

The display devices typically contain multiple layers and each layer is bonded to the other and sealed to prevent degradation and moisture egress. Optically clear adhesives (OCA) films are used to bond the layers, including cover glasses, touch panels and other layers in display devices, to fill in the air gaps between different layers of the displays, and to improve the image quality and the durability of the displays. Typically, there is at least one layer of OCA film in any LCD or LED displays. While display devices utilize some type of UV blocking layers in the devices, such as UV blocking cover glasses, plastic films, and coatings; little effort has been made to make an optically clear adhesives (OCA) with UV blocking.

One solution-polymerized OCA layer that includes a UV blocking adhesive layer is disclosed in US 2013/0321991; however, there are several drawbacks to this solution. This solution-polymerized OCA layer shrinks upon UV curing, and thus debonds the substrates. Moreover, uneven layer of the adhesive is produced, where the edges are thinner than the center of the adhesive.

Ink compositions and methods related to UV blocking inks for transparent substrates is disclosed in US 200/30109599. While the ink compositions may prevent UV transmission, they do not have adhesion properties to bond substrates together.

There remains a need in the art for optically clear adhesive films for display electronic devices with high optical clarity in the visible light range, while blocking a substantial percentage of transmission of harmful UV radiation A, B, and C over an extended period of time. The current invention fulfills this need.

SUMMARY OF THE INVENTION

The present invention is directed to optically clear adhesive compositions with UV blocking suitable for sealing and adhering substrates in display devices.

One object of the present invention is to provide a UV absorber package by combining more than one UV absorbers. The UV blocking OCA compositions are made by mixing OCA compositions with the UV blocking package. Preferably the UV blocking OCA compositions absorb more than about 90% of UV transmission below 380 nm and less than about 10% of UV transmission above 410 nm.

One aspect of the invention is an optically clear adhesive composition comprises a mixture of:
(a) about 85 to about 99.7% of a pressure sensitive adhesive;
(b) about 0.3 to about 15% of a UV absorber package comprising:
  (i) about 0.1 to about 5% hydroxyphenyl benzotriazole or its derivatives;
  (ii) about 0.1 to about 5% % benzophenone or its derivatives; and
  (iii) about 0.1 to about 5% % hindered amine light stabilizer;
wherein the cured adhesive has a percent transmittance of less than 10% at 380 nm or less, and a percent transmittance greater than 90% at 410 nm or greater, measured in accordance with ASTM E903.

These and other aspects of the invention are described in the detailed description below. In no event should the above summary be construed as a limitation on the claimed subject matter which is defined solely by the claimed as set forth herein.

DETAILED DESCRIPTION OF THE INVENTION

All documents cited herein are incorporated in their entireties by reference.

Percent, unless expressly stated otherwise, means dry solid weight percent based on the total weight of the components.

As used herein, a polymer or an oligomer is a macromolecule that consists of monomer units is equal or greater than about two monomer units. Polymer and oligomer are used interchangeably herein.

As used herein, the terms "reactive" refer to a molecule's ability to undergo condensation reaction in the presence of an acid or a base catalyst.

As used herein, the term "alkyl" refers to a monovalent linear, cyclic or branched moiety containing C1 to C24 carbon and only single bonds between carbon atoms in the moiety and including, for example, methyl, ethyl, propyl, isopropyl, n-butyl, sec-butyl, isobutyl, tert-butyl, n-pentyl, n-hexyl, heptyl, 2,4,4-trimethylpentyl, 2-ethylhexyl, n-octyl, n-nonyl, n-decyl, n-undecyl, n-dodecyl, n-hexadecyl, n-octadecyl and n-eicosyl.

As used herein, the term "aryl" refers to an monovalent unsaturated aromatic carbocyclic group of from 6 to 24 carbon atoms having a single ring (e.g., phenyl) or multiple condensed (fused) rings, wherein at least one ring is aromatic (e.g., naphthyl, dihydrophenanthrenyl, fluorenyl, or anthryl). Preferred examples include phenyl, methyl phenyl, ethyl phenyl, methyl naphthyl, ethyl naphthyl, and the like.

As used herein, the term "alkoxy" refers to the group —O—R wherein R is alkyl as defined above.

As used herein, the term "(meth)acryloxy group" represents both acryloxy and methacryloxy group.

As used herein, the terms "pressure sensitive adhesive" or "PSA," used interchangeably, refers to a viscoelastic material which adheres instantaneously to most substrates with an application of slight pressure and remains permanently tacky.

As used herein, the terms "film" refers to an adhesive in a free-standing form that adhere the components and/or substrates together in a device.

As used herein, the term "optically clear" or "optical clarity" refers to transmission of a film of 90% or greater measured in accordance with ASTM E903 at 500 nm or above.

As used herein, the terms "display device" and "display electronic device," used interchangeably, refer to an article that has various components such as, circuits or active layers in between a cover front sheet and a substrate back sheet, and operates by manipulating the flow of electrons, e.g., displays, including flexible and foldable displays, outdoor displays, LCD displays, LED displays; diffusers; rigid compensators; heaters; flexible polarizers; touchscreens; flexible thin film photovoltaic cells; mobile phone; tablet PC; TV; notebook PC; digital camera; photo frame; car navigation; and the like.

The invention provides optically clear adhesives (OCA) comprising (a) a curable pressure sensitive adhesive (PSA) and (b) a package of UV absorbers that can block UV light below 380 nm wavelength, but transparent in the visible light range above 400 nm wavelength. Examples of the curable PSA includes, but are not limited to, UV-curable polyisobutylene PSA, UV-curable styrenic block copolymer PSA, and UV- or thermal-curable silicone PSA, UV-curable acrylic PSA, and the like. In one embodiment, the optically clear adhesive composition comprises: (a) about 85 to about 99.7% of a pressure sensitive adhesive; and (b) about 0.3-15% of a mixture of UV absorbers comprising: (i) about 0.1 to about 5% hydroxyphenyl benzotriazole or its derivatives; (ii) about 0.1 to 5% % benzophenone or its derivatives; and (iii) about 0.1-5% % hindered amine light stabilizer. The optically clear adhesive composition has a percent transmittance (% T) of less than 10% at less than 380 nm and greater than 90% at greater than 410 nm, measured in accordance with ASTM E903.

The UV absorbers function by competitive absorption of detrimental UV radiation. They generally absorb UV radiation much more strongly than other adhesive components and the active layers in the display devices that they protect. The excited states formed upon UV absorption relax to the ground state rapidly and efficiently through radiation-less processes such as heat, which is then dissipated through the surface of the adhesive layers and the display devices, and thus, imparts high stabilization efficiency and excellent UV stability.

Many commercial UV absorbers are suitable as the OCA package in the invention. UV absorbers are categorized by chemical class, for example benzotriazole and derivatives, benzophenones and derivatives, cyanoacrylate and derivatives, triazine and derivatives, esters of substituted and unsubstituted benzoic acids, and a mixtures thereof. Each class has its own UV absorbance characteristics. For example, benzophenone- and triazine-types tend to absorb more strongly in the short wavelength UV-B region than the benzotriazole-types.

Hindered amine light stabilizers (HALS) do not absorb radiation; instead they protect the adhesive films or the display devices from the harmful effect of photochemically produced 'free radicals' by neutralizing them, hindering chemical degradation. HALS regenerate themselves during the neutralization process providing protection throughout the lifetime of the OCA films. Generally, hindered amine light stabilizers are secondary, tertiary, acetylated, N-hydrocarbyloxy substituted, hydroxyl-substituted N-hydrocarbyloxy substituted, or other substituted cyclic amines which are characterized by a substantial amount of steric hindrance, generally derived from aliphatic substitution on the carbon atoms adjacent to the amine function.

A mixture of different UV absorbers and HALS is necessary to completely block radiation below 380 nm. It was discovered that a specific combination of UV absorbers and hindered amine light stabilizers showed synergistic performance, attain the best resistance to weathering, and provide light stabilization in various polymers, coatings, and other plastics. Surprisingly, a combination or a package of benzotriazole derivatives, benzophenones derivatives and HALS blocked UV light below 380 nm but allowed transparency to visible light greater than 400 nm. Particularly, a combination of hydroxyphenyl benzotriazole or its derivatives, benzophenone or its derivatives, and hindered amine light stabilizer blocked most UV light below 380 while allowing transparent visible light through in different types of PSAs. The most preferred package is 2-[2-hydroxy-3-dimethylbenzylphenyl-5-(1,1,3,3-tetramethylbutyl)]-2h-benzotriazol, 2-Hydroxy-4-n-octyloxybenzophenone, and bis(2,2,6,6,-tetramethyl-4-piperidyl)sebaceate. Examples of this combination includes Tinuvin-928, Chimassorb-81 and Tinuvin-770. The preferred level of UV absorbers and HALS is from about 0.3% and up to about 15% based on the total weight of OCA composition.

This particular combination of hydroxyphenyl benzotriazole, benzophenone and hindered amine light stabilizer surprisingly minimize UV light below 380 nm, without negatively affecting transparency to visible light in various pressure adhesive systems. This package was effective to block UV light below 380 nm in polyisobutylene-based, UV-curable styrene block copolymer-based, UV-curable acrylic-based, and UV curable or thermally curable silicone-based pressure sensitive adhesives, while allowing for transparency in the visible light region above 410 nm.

One embodiment of the curable PSA is a UV curable polyisobutylenes (PIB) PSA comprising polyisobutylenes, multifunctional (math)acrylates, diluents, tackifiers and photoinitiators. The UV curable polyisobutylene-based pressure sensitive adhesive composition, based on the total weight of the pressure sensitive adhesive, comprises: (i) about 1 to about 30% of a (meth)acrylate monomer, a (meth)acrylate oligomer or mixtures thereof; (ii) about 10 to about 90% a polyisobutylene polymer; (iii) about 5% to about 50% a liquid diluent, a tackifier, or mixtures thereto; and (iv) about 0.001 to 5% a photoinitiator. The PIB is substantially a homopolymer of isobutylene. Commercially available PIB includes, but not limit to, Oppanol, Glissopal, and Indopol. While many of these PIBs may contain even up to 75% terminal alpha C=C bonds, the reactivity of these PIBs towards UV free radical reaction are relatively low and incomplete, and are therefore considered to be non-reactive or non-curable PIBs. Moreover, the weight average molecular weight (Mw) of the PIB ranges from about 1,000 to about 1,000,000 g/mol. PIB in the curable PSA is in the amount ranging from about 5 to about 99 weight percent, more preferably from about 30-95 weight percent, based on the total weight of the curable OCA, without accounting for any solvent.

The (i) (meth)acrylate monomer is a mono or multifunctional (meth)acrylic monomers, and the (meth)acrylate oligomer is a (meth)acrylic functionalized polyisobutylene, polybutadiene, hydrogenated polybutadiene, or a polyolefin having greater than one (meth)acrylic functional group per molecule, wherein the reactive functional group is selected from the group consisting of terminal methacrylates, pendant methacrylates, terminal acrylates, and/or pendant acrylates; and mixtures thereof. The (meth)acrylate oligomer or mixtures thereof have a weight average molecular weight (Mw) of from about 1000 to about 95,000 g/mol. The liquid diluent is mineral oil, a wax, polyisobutylene, polybutene, or a synthetic liquid polymer. The tackifier is a fully hydrogenated soft block, partially hydrogenated soft block, aliphatic hard block modifying tackifier or aromatic hard block modifying tackifier.

Another embodiment of the curable PSA is a UV-curable styrene block copolymer (SBC) PSA comprising fully hydrogenated soft blocks, multifunctional (math)acrylate, liquid diluents, tackifier and a photoinitiator. The UV curable styrenic block copolymer-based pressure sensitive adhesives, based on the total weight of the pressure sensitive adhesive, comprises (i) about 5% to about 30% of a (meth) acrylate monomer, or a (meth)acrylate oligomer, or mixtures thereof; (ii) about 5% to about 30% a styrenic block copolymer having fully hydrogenated and saturated soft blocks; (iii) about 55% to about 79.99% a liquid diluent, a tackifier, or mixtures thereof; and (iv) about 0.01% to about 5% a photoinitiator.

The styrenic block copolymer is a triblock, a diblock, or mixtures thereof. The styrenic block copolymer is a linear block copolymer with a general block configuration of A-B-A, or A-B, wherein the A is a non-elastomeric polymer hard block having a homopolymers glass transition temperatures (Tg) of above 20° C., and B is a saturated elastomeric soft block soft block having a Tg of from about −30° C. to about room temperature, more preferable from about −30° C. to about 10° C. The hard or styrenic block may comprise homopolymers or copolymers of vinyl monomers such as vinyl arenes, vinyl pyridines, vinyl halides and vinyl carboxylates, as well as acrylic monomers such as acrylonitrile, methacrylonitrile, methyl esters of (meth)acrylic acids, etc., vinyl arenes hydrocarbons include particularly those of the benzene series such as styrene, alpha-methyl styrene, vinyl toluene, vinyl xylene, ethyl vinyl benzene as well as dicyclic monovinyl compounds such as vinyl naphthalene and the like. Styrene monomer as the hard block is preferred.

The saturated soft or saturated elastomeric (hereinafter interchangeably used) block B of the are selected from the groups consisting of ethylene, propylene, butylene, isobutylene, ethylene-propylene, ethylene-butylene, and mixtures thereof, as taught, for example, in U.S. Pat. No. 3,700,633. The hydrogenation converts unsaturated C=C bonds to saturated C—C bonds. Selected conditions can be employed to fully hydrogenate the soft block while not modifying the styrenic hard blocks. Other conditions may be chosen to hydrogenate substantially uniformly along the polymer chain, both the soft and hard styrenic blocks thereof being hydrogenated to practically the same extent. Block polymers with fully hydrogenated soft block minimize degradation during processing and device life time exposure to heat and light. Thus, styrenic block copolymer with fully hydrogenated and saturated soft block of isoprene, butadiene, or mixtures thereof, are preferred. Further, other soft block component that are useful are isobutylene, C4-C24 aliphatic esters of (meth)acrylic acids.

The styrenic block copolymer can have a broad ratio of hard block to soft block, and may have a ratio of about 5:95 or less, to about 40:60 or higher.

Non-limiting examples of block copolymers include triblock styrene-ethylene/butylene-styrene block copolymers (SEBS) and styrene-ethylene/propylene-styrene block copolymers (SEPS) available as KRATON G series. Other triblock copolymers useful in the present invention include hydrogenated polyisoprene/butadiene (SEEPS) having styrene monomer units and hydrogenated conjugated diene monomer available as SEPTON 4033-4055 from Kuraray; and hydrogenated poly-isoprene/butadiene polymers that consists of blocks of styrene monomers and hydrogenated conjugated diene monomer units. Also included are triblock copolymer, such as styrene-isobutylene-styrene block (SIBS) copolymers available from Kaneka, under the trade name SIBSTAR 062T, 073T. The styrenic block copolymers may also be branched or radial. Typical branched structures contain an elastomeric portion with at least three branches which can radiate out from a central hub or can be otherwise coupled or grafted together. The radial block copolymer comprises a structure of (polystyrene-midblock)$_n$X, where X is a residue of a multifunctional coupling agent used in the production of the radial block copolymer, and n is a number equal to or greater than 3 and represents the number of polystyrene-midblock arms appended to X. The number n ranges on average from about 3 up to about 10. In one embodiment, up to 75% of linear block copolymer may be replaced with the branched or radial styrenic block copolymer. The amount of the SBC component is preferably from about 0.01 to about 50 parts by weight, more preferably about 0.5 to about 20 parts by weight.

In another embodiment, the styrenic block copolymer comprises a separate diblock copolymer, having a general A-B configuration, where A and B are as described previously above and also having a viscosity greater than 1000 cps at 25 C at 20 wt % in toluene. Preferred diblock copolymer are KRATON G1701X or 1702X which are both styrene ethylene propylene diblock polymers. KRATON G1702X is most preferred. While the adhesive formulation preferably contains the above diblock component for a better peel adhesion, the diblock copolymer may be replaced partially or entirely with other non-block polymer that is compatible with the adhesive formulations. For example, polyisobutylene (e.g., OPPANOL from BASF), polyisoprene (e.g., liquid isoprene rubber from Kuraray), polybutene (e.g Indopol from Ineos), polypropylene (e.g VISTAMAXX™ from ExxonMobil Chemicals), or styrene/butadiene copolymer (e.g., PLIOFLEX from Goodyear) or high flowabilty block copolymers SEPTON 2063, 2043 & 2002 from Kuraray) may also be used in amounts up to 40 parts by weight.

Optionally, a portion of the styrenic block copolymer may be replaced with non-block polymers that are compatible with the styrenic block copolymer. Examples of such polymer include amorphous polyalphaolefin (APAO), which are random copolymers or terpolymers of ethylene, propylene, and butene, and other substantially amorphous or semicrystalline polymers. Commercially suitable APAO includes REXTAC (Rexene LLC), EASTOFLEX (Eastman Corporation), and VESTOPLAST (Evonik Corporation). Metallocene catalyzed semicrystalline polyolefin with melting point less than about 100° C. can also be suitable in the pressure sensitive adhesive. Low melting point semicrystalline polyolefins may also replace the styrenic block copolymers in the adhesive, and examples of such semicrystalline polyolefins include C2-C6 polyolefins having a polydispersity index less than about 3. These low melting point semicrystalline polyolefins are commercially available from Exxon Mobil as the LINXAR series. The liquid diluent is mineral oil, a wax, polyisobutylene, polybutene, or a synthetic liquid polymer. The tackifier is a fully hydrogenated soft block, partially hydrogenated soft block, aliphatic hard block modifying tackifier or aromatic hard block modifying tackifier.

The UV curable PSA of PIB and SBC may further comprise a liquid diluent, tackifier or mixtures thereof. The liquid diluent includes oils, liquid plasticizers, and liquid rubbers. The diluents are known to associate with the particular blocks (domains) of the styrenic block polymer(s), altering the behavior of those portions accordingly. In more detail, the soft block portion or domain (i.e., the "B-block") of the polymer needs to have a Tg less than about room temperature. As other soft block compatible components such as liquid diluent and tackifiers are added, these components associate with the B domains swelling them and generally resulting in a change in the Tg thereof. For most pressure sensitive adhesive applications, a Tg should be in the range of about 0° C. to 25° C.; however for use herein, the soft block Tg ranges can be from −40° C. up to about 10° C., and preferably from about −20° C. to about 10° C. A useful diluent is primarily aliphatic in character, and is compatible with the polymer soft block. Included in these materials are plasticizers such as paraffinic and naphthenic petroleum oils, highly refined aromatic-free paraffinic and naphthenic food and technical grade white petroleum mineral oils, and liquid plasticizers such as the synthetic liquid oils or rubbers of polymerized C5 petroleum feed stream, polybutene, polyisobutylene, polyisoprene, polypropene, polyterpene, polybutadiene, or a copolymer thereafter and hydrogenated derivatives, etc., with weight average molecular weight (Mw) less than 100,000 g/mol. The synthetic oils are low viscosity oligomers which are permanently liquid monolefins, isoparaffins or paraffins. Preferably, the diluent is a white oil that does not yellow at elevated temperatures and/or over time. Commercially available liquid polybutene, polyisobutylene, polyisoprene, polybutadiene, include, but not limit to, polyisoprene available as LIR 50 from Kuraray, polybutenes available under the name of INDOPOL from Ineos, polyisobutylene under the names of OPPANOL and GLISSOPAL from BASF; polybutadiene under the names of Polybd45CT, Polybd2000CT, Polybd3000CT, available from Sartomer. Polyisoprene LIR-30, LIR-50, LIR-290 available from Kuraray, TEA-1000, TE2000, GI-1000, GI-2000, GI-3000, BI-2000, BI-3000, JP-100, available from Nippon Soda; BI-2000 is a hydrogenated 1,2-polybutadiene homopolymer with a number average molecular weight of around 2100. GI-2000 is a hydroxy-terminated hydrogenated 1,2-polybutadiene, with a number average molecular weight of around 2100. The liquid diluent in the adhesive is in the amount ranging from about 0.01 to about 80%, preferably, greater than about 10%.

Examples of liquid tackifiers include rubbers of polymerized C5 petroleum feed stream and polyterpenes such as WINGTACK 10 available from Goodyear, and ESCOREZ 2520 available from Exxon Chemical. Suitable tackifiers are soft block tackifiers and they include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 50° to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic aromatic copolymers and their hydrogenated derivatives. Preferred tackifiers for use herein include polyterpenes such as PICCOLYTE A125 from Piova; aliphatic resins such as Wingtack 95 from Goodyear; cycloaliphatic resins such as EASTOTAC H100 from Eastman; and aliphatic/aromatic or cycloaliphatic/aromatic resins and their hydrogenated derivatives such as ECR 149B, ECR 179A, ESCOREZ 5380 from Exxon Chemical. Most preferred are the aliphatic or cycloaliphatic resins while the least desirable are the rosin esters or phenolic modified polyterpenes are least preferred. The desirability and selection of the particular tackifying agent is, in large part, dependent upon the specific block copolymer employed. The midblock tackifier in the adhesive is in the amount ranging from about 0.01 to about 80 parts, more preferably from about from about 10 to about 60 parts.

Additionally, it may be desirable to incorporate a hard block tackifying resin in the adhesive. Hard block tackifying resins are those resins described in U.S. Pat. No. 6,448,303, as residing in the non-elastomer domains of the rubber after the adhesive is cooled. Representative of such resins are the primarily aromatic resins based on mixed C9 petroleum distillation streams such as the PICCO materials available from Eastman, or resins based on pure or mixed monomer streams of aromatic monomers such as homo or copolymers of vinyl toluene, styrene, alpha-methyl styrene, coumarone or indene. Preferred are those based on alpha-methyl styrene available from Eastman under the KRISTALEX trade name. If present, the hard block resin is generally used in an amount of 1 to 30 parts by weight, preferably less than 10 parts.

The UV curable PSA of either PIB or SBC further comprises a multifunctional (meth)acrylate, or mixtures thereof. One particular suitable reactive functional components are (meth)acrylic monomers or (meth)acrylate terminated oligomers having at least two (meth)acrylic functionalities per oligomer chain. The amount of reactive functional components in the invention are ranged from about 1 to about 60 parts by weight, more preferably from about 0.5 to about 50 parts by weight, more preferably from about 5 to about 30 parts by weight, most preferably from about 10 to about 25 parts based on the total weight of the adhesive.

Examples of suitable (meth)acrylate monomers in the invention are ester of (meth)acrylic acid including aliphatic, alicyclic, aromatic, heterocyclic, and/or epoxy functionality. In some embodiments, saturated long-chain alkyl (meth) acrylates, cycloaliphatic (meth)acrylates, (meth)acrylate/epoxy monomers, or combinations thereof can be utilized as monomers because they can enhance the miscibility with high molecular triblock copolymer and optional liquid diluents and tackifiers. The (meth)acrylate monomer can be unsubstituted or substituted with various groups such as hydroxy or alkoxy groups. Exemplary long chain alkyl (meth)acrylates include, but are not limited to, octyl (meth) acrylate, stearyl (meth)acrylate. Exemplary cycloaliphatic (meth)acrylates include, but are not limited to, isobornyl (meth)acrylate, tetramethylpiperidiyl methacrylate, pentamethylpiperidiyl methacrylate, dicyclopentanyl (meth)acrylate, dicyclopentenyl (meth)acrylate, and (meth)acrylated epoxies.

In some embodiments, (meth)acrylate monomers having two, three, four, or even more than four (meth)acrylate groups may be utilized and even preferred, which are called multifunctional (meth)acrylate monomers. It will also be understood by one of skill in the art that mixtures of multifunctional (meth)acrylate monomers can be utilized. The multifunctional (meth)acrylate monomer may be selected so as to enhance the adhesive cohesive strength after UV or heat cure and optimize adhesion and wettability of the adhesive composition. Examples of suitable multifunctional (meth)acrylate monomer in the invention are, but not limited to, 1,9-nonanediol di(meth)acrylate, 1,10-decanediol di(meth)acrylate, and tricyclodecanediol di(meth) acrylate, tricyclodecane dimethanol di(meth)acrylate, tetraethylene glycol diacrylate, dipentaerythritol pentaacrylate.

Examples of suitable (meth)acrylate terminated oligomers in the invention include, but are not limited to, (meth) acrylate functional polyisobutylene (PIB) are described in U.S. Pat. Nos. 5,171,760, 5,665,823, and Polymer Bulletin, Vol. 6, pp. 135-141 (1981), T. P. Liao and J. P. Kennedy. Preferred (meth)acrylate functional PIB is (meth)acrylic endcapped PIB having (i) a Mw of from about 1,000 to about 100,000 g/mol and (ii) contains greater than one (meth) acrylic per polymer chain. Other (meth)acrylate oligomers in the invention also include, but are not limited to, (meth) acrylic terminal and pendant liquid polymers, or copolymers of butadiene, isoprene, ethylene, propylene, butene, and derivatives. These functionalized oligomers have a Mw from about 1,000 to about 100,000 g/mol and contains greater than one free-radical reactive functional group in the polymer chain. The functionalized oligomers is preferably selected from terminal methacrylates, pendant methacrylates, terminal acrylates, and/or pendant acrylates. Exemplary functionalized oligomers include, but are not limited to, di(meth)acrylated-polybutadienes, di(meth)acrylated-polyisoprenes, hydrogenated di(meth)acrylated-polybutadienes, hydrogenated di(meth)acrylated-polyisoprenes, (meth)acrylated EPDM rubber (ethylene propylene diene copolymer), and (meth)acrylated butyl rubber, many of which are available from Sartomer and Kuraray. "(Meth) acrylated" is defined herein as being functionalized with either acrylate or methacrylate. Yet exemplary other free radical reactive oligomers that are (meth)acrylated and can be partially or completely replace the functional PIB or polyolefin-like oligomers, include, but are not limited to, (meth)acrylated-polyurethanes, (meth)acrylated-polyesters, (meth)acrylated styrene-butadiene copolymer, (meth)acrylated acrylonitrile-butadiene copolymer, (meth)acrylated polysiloxanes, (meth)acrylated bromobutyl rubber (bromoisobutylene-isoprene copolymer), (meth)acrylated chlorobutyl rubber (chloroisobutylene-isoprene copolymer. These resins are commercially available without the (meth) acrylate functionality and can be functionalized without undue experimentation by those skilled in the art.

The UV curable PSA of either PIB or SBC further comprises a photoinitiator, or mixtures thereof. The photoinitiator is a radical polymerization initiator that generates radicals by electromagnetic energy rays such as UV light. Photopolymerization initiating system comprising one or more photoinitiators can be found in Fouassier, J-P., Photoinitiation, Photopolymerization and Photocuring Fundamentals and Applications 1995, Hanser/Gardner Publications, Inc., New York, N.Y. Suitable radical photoinitiators include Type I alpha cleavage initiators such as acetophenone derivatives such as 2-hydroxy-2-methylpropiophenone and 1-hydroxycyclohexyl phenyl ketone; acylphosphine oxide derivatives such as bis(2,4,6-trimethylbenzoyl) phenylphosphine oxide; and benzoin ether derivatives such as benzoin methyl ether and benzoin ethyl ether. However, since a package of UV absorbers used in the invention to block UV light <380 nm, a suitable photoinitiator is one that exhibits a light absorption >380 nm, that is distinct from that of the UV absorbers. A red shifted photoinitiator or a photosensitizer with the photoinitiator into the photoinitiating system, to augment the transfer of energy to the photoinitiator. Examples of such photoinitiators include, but are not limited to, IRGACURE® 819, IRGACURE® 2022, Lucirin TPO or TPO-L, which are commercially available from BASF. The amount of the photoinitiator is typically in a range of about 0.01 to about 10 wt %, preferably, from about 0.01 to about 5 wt %, based on the total weight of the encapsulant, without accounting for solvent.

The term radiation cure herein refers to crosslinking, toughening, hardening or vulcanization of the curable portion of the PIB or SBC PSAs through actinic radiation exposure. Actinic radiation is electromagnetic radiation that induces a chemical change in a material, and for purposes within this specification and claims will include electron-beam curing. In most cases, such radiation is ultraviolet (UV) or visible light. The initiation of radiation cure is achieved through the addition of an appropriate photoinitiator. The cure of the adhesive is achieved by direct exposure to ultraviolet (UV) or visible light or by indirect exposure through transparent cover sheet that are made of polyester, polycarbonate, glass, and the like. Either non-functional PIB or the fully hydrogenated and saturated soft blocks of the styrenic copolymer, and the (meth)acrylate monomer or oligomer having at least two (meth)acrylic functionalities per oligomer chain forms a polymer crosslinking network at PIB or soft block domains upon radiation. The PIB or soft block of SBC PSAs and the crosslinked monomers or oligomers are partially interlaced but not covalently bonded to each other. This network is entangled in a way that they cannot be readily separated. The IPN locks the soft blocks of the styrenic block copolymers and the crosslinked (meth)acrylates in place and prevents the adhesive from flowing upon exposure to heat. The elastic modulus (G') of the instant adhesive increases at elevated temperatures after IPN structures are formed. Both elastic modulus (G') and loss modulus (G") of cured adhesive increase by at least one order of magnitude at elevated temperatures once the IPN structure is formed.

Yet another embodiment of the curable PSA is a UV curable or thermally curable silicone PSA comprising (i) a reaction product of a reactive siloxane polymer, a reactive silicone resins and a reactive functional silane and/or reactive functional siloxane polymer; (ii) a crosslinker; and (iii) a catalyst. The reactive siloxane polymer is a polydiorganosiloxane polymer having α,ω-endcapped OH or alkoxy groups. In a preferred embodiment, polydiorganosiloxane polymer is polydialkylsiloxane, polydiaryysiloxane, polyalkylarylsiloxane polymer or oligomer, with at least two or more (RR'SiO) unit, wherein R and R' are alkyl or aryl. In a more preferred embodiment, polydiorganosiloxane polymer is silanol (OH) end-capped polydimethylsiloxane polymer (PDMS). Other diorganosiloxane polymer includes siloxane polymer with the diorgano substitutes of methylvinyl, methylethyl, and 3,3,3-trifluoropropylmethyl.

The reactive silicone resin is a network of silicone polymer that contains a combination of $R_3SiO_{1/2}$ (M unit), $R_2SiO_{2/2}$ (D unit), $RSiO_{3/2}$ (T unit) and/or $SiO_{4/2}$ (Q unit) in the cage-like chemical Si—O—Si structure. It can be made according to U.S. Pat. Nos. 2,676,182, 2,814,601 or obtained from various commercial sources. Preferred functionalized silicone resin is a silicone resin having both M unit and Q unit, also known as MQ resin. Useful reactive MQ silicone resins in the invention include silicone resins that contain 0.05 to 5 weight percent of silicone-bound hydroxyl group and further comprise M and Q units in a mole ratio of from 0.5-1.5 M units for each Q. The MQ resin is soluble in toluene, xylene, heptane, and the like. Preferred R groups of the M unit in MQ resin are methyl and hydroxyl. The mole ratio of $SiO_{4/2}$ (Q unit) to $R_3SiO_{1/2}$ (M unit) ranges from 1:2 to 2:1. One preferred R group is a combination of hydroxyl and methyl groups, with 0.001 to 1 Si—OH for each Si-Me. The preferred MQ resin has a weight average molecular weight of from about 500 to about 200,000 g/mol.

The reactive functional silane for thermal cure silicone PSA is a vinylalkoxy functional silane with a structure of $R'_x(R''O)_ySi$ (vinyl)$_{4-n}$, wherein n is 1 to 3; x+y=4−n, R' R'' is alkyl or aryl group. Example of the vinylalkoxy functional is vinyltrimethoxysilane, vinylmethydimethoxysilane.

The reactive functional silane for UV cure silicone PSA is a (meth)acryloxyalkyl alkoxy functional silane with a structure of $RSi(OR')_nR''_{3-n}$, wherein n is 1 to 3, R' R'' is alkyl or aryl group. R is methacryloxyalkyl or acryloxyalkyl groups. Example of the (meth)acryloxyalkyl alkoxy functional silane is methacryloxypropyltrimethoxysilane, acryloxypropyltrimethoxysilane, methacryloxyethyltrimethoxysilane, and methacryloxypropyldimethoxymethylsilane.

The reactive functional siloxane polymer is a (meth)acryloxyalkyl alkoxy terminated siloxane polymer with a structure of polydiorganosiloxane polymer having α,ω-endcapped $RR'_nR''_{2-n}SiO$, wherein R is (meth)acryloxyethyl, or (meth)acryloxypropyl; R' is alkoxy; R'' is alkyl, and n is 1 to 2. In a preferred embodiment, the (meth)acryloxyalkyl alkoxy alkoxy terminated siloxane polymer is polydimethylsiloxane with terminal functional groups of (meth)acryloxypropyldimethoxysilyl, (meth)acryloxypropylmethylmethoxysilyl, (meth)acryloxyethyldimethoxysilyl, (meth)acryloxyethylmethylmethoxysilyl, or mixtures thereof. A particularly preferred reactive functional PDMS is methacryloxypropyldimethoxy terminated PDMS made by Henkel Corporation, as described in U.S. Pat. No. 5,300,608. The average molecular weight of the (meth)acryloxyalkyl alkoxy terminated siloxane polymer from about 100 to 300,000 g/mol. The preferred average molecular weight of the (meth)acryloxyalkyl alkoxy terminated siloxane polymer from about 400 to 100,000 g/mol.

The reaction product is obtained by a condensation reaction of the reactive siloxane polymer, the reactive silicone resins, and the reactive functional silane and/or reactive functional siloxane polymer in the presence of a strong base catalyst. Examples of the preferred catalyst are KOH, NaOH, LiOH, organolithium reagents, Grignard reagents. The reaction is conducted in an organic solvent or co-solvents, selected from the aliphatic hydrocarbons, aromatic hydrocarbons, diethyl ethers, tetrahydrofurane, ketones, acetates, water and mixtures thereof. Preferred solvents include xylene, toluene, heptane, tetrahydrofuran, and mixtures thereof. The reaction yields a product of lightly cross-linked network through Si—O—Si covenant bond among these reactants. At the same time, the reaction releases water and alcohol as by-products. The condensation reaction usually takes place at room temperature and/or up to about 150° C. The preferred temperature is in the range of 60-120° C. Typically, the reaction is from about 1 to about 24 hours. Optionally, hexamethyldisilazane can be added to react with any residual silanol. The reaction will be terminated by $CO_2$. The reactive functional silanes or siloxane contains vinyl or (meth)acrylate, the reaction product can undergo further crosslinking via heat, UV light, under corresponding conditions. Thus, the reaction of these reactants can give UV-curable, or thermal curable OCA, as describe in the invention. The solid content of the reaction product is from about 20 to 80%, and can be adjusted by adding or removing solvent. The obtained solution will be used to further to make thermal curable or UV curable silicone OCAs.

The thermal curable silicone OCA in the invention further comprises the reaction product of the above and a hydride functional siloxane polymer and a thermal cure catalyst. The term "heat cure" herein refers to toughening, hardening or vulcanization of the curable portion of the adhesive through exposure to heat in oven, infrared (IR), near IR, or microwave. The heat cure temperature is between 50-200° C., preferably 60-150° C. The initiation of the heat cure is achieved through the addition of an appropriate thermal catalyst. The thermal curable silicone pressure sensitive adhesives comprises: (i) about 94.5% to about 99.998% vinyl functional silicone; (ii) about 0.001 to about 5% of a hydride functional siloxane polymer or oligomer; and (iii) about 0.001 to about 0.5% of a Pt catalyst. The vinyl functional silicone is any a mixture and/or a reaction product of polydimethylsiloxane polymers, silicone resins, and silanes that contain one or more vinyl functional group.

The hydride functional siloxane polymer or oligomer is H-terminated polydiorganosiloxane polymers. In a preferred embodiment, polydiorganosiloxane polymer is polydialkylsiloxane, polydiarylsiloxane, polyalkylarylsiloxane polymers, with at least two or more (RR'SiO) unit, wherein R and R' are alkyl or/and aryl. In a most preferred embodiment, polydiorganosiloxane polymer is $SiMe_2H$ end-capped polydimethylsiloxane polymer (PDMS). The hydride functional siloxane polymer (ii) is a polydimethylsiloxane polymer or oligomer with terminal functional groups of $SiMe_2H$, or with pedant functional groups of SiMeH, or mixtures thereof, and the average weight molecular weight of from about 400 to 100,000 g/mol. Another hydride functional siloxane polymer or oligomer is polydiorganosiloxane polymers having the structure of $(SiR'R''O)_m$—$(SiRH)_n$—, wherein R, R', and R'' are alkyl, aryl group. The mole percentage of n/(m+n) is from about 0.1 to 50%, preferably from about 1-20%.

The catalyst for the thermal curable silicone pressure sensitive adhesive composition in the invention is a transition metal complex of Pt, Rh, Ru. The preferred catalyst is Speier's catalyst $H_2PtCl_6$, or Karstedt's catalyst, an alkene-stabilized platinum (0).

There are two forms of thermal curable silicone OCA in the invention: 1K as one component, or 2K as two components. As for the 1K thermal curable pressure sensitive adhesive, a hydride functional siloxane polymer and a thermal cure catalyst are added to form 1K thermal curable pressure sensitive adhesive. An inhibitor is added to 1K thermal curable pressure sensitive adhesive solution, as well known in the art. Examples of the inhibitor, includes α-acetylenic compounds, such as acetylenic alcohols, acetylenic a,a'-diols, 2-methyl-3-butyn-2-ol and ethynylcyclohexanol (ECH), 2,4,7,9-tetramethyl-5-decyne-4,7-diol (TMDD), 4,7-dimethyldec-5-yne-4,7-diol, 3,6-dimethyloct-4-yne-3,6-diol, tetradec-7-yne-6,9-diol, 3,6-diisopropyl-2,7-dimethyloct-4-yne-3,6-diol, 1,3-divinyltetramethyldisiloxane; vinyltrimethylsilane, divinyldimethylsilane, 3-methyl-3butyn-3-ol, dimethyl maleate, dimethyl fumarate, diethyl fumarate, and a mixture thereof.

As for the 2K thermal curable Si OCA in the invention, the part A contains the reaction solution and the thermal cure catalyst are added. The solid content of the reaction is from about 20 to 80%, and can be adjusted by adding or removing solvent. The part B is 100% of the hydride functional siloxane polymer. Part A and Part B will be mixed to form the final curable adhesive composition. The open time is between 1 to 24h.

In one embodiment, the thermal curable silicone PSA solution is formed by first preparing a reaction product of (a) in an organic solvent of (i) a reactive siloxane polymer, with average molecular weight >100,000 g/mol; (ii) a reactive siloxane polymer, with average molecular weight <50,000 g/mol; (iii) a reactive silicone resin; and (iv) a vinylalkoxy functional silane; and (iv) a base catalyst in an organic solvent to form a soluble and vinyl functional silicone network; and then combining the reaction product with a hydride functional siloxane polymer (b) and a thermal cure catalyst;

The UV curable silicone OCA in the invention further comprises the reaction composition and a photoinitiator. The solid content of the mixture is from about 20 to 80%, and can be adjusted by adding or removing solvent. The usable photoinitiator (b) in the UV curable silicone OSA is similar to the photoinitiators for UV curable PIB and SBC PSA. The UV curable silicone pressure sensitive adhesive, based on the total weight of the pressure sensitive adhesive, comprises: (i) about 99.5% to about 99.999% (meth)acryloxy functional silicone and (ii) about 0.001 to about 0.5% of a photoinitiator catalyst. Preferably, the photoinitiator is present from about 0.01 to about 1 parts, based on the 100 parts of total weight of the adhesive.

The (meth)acryloxy functional silicone is a mixture and/or a reaction product of polydimethylsiloxane polymers, silicone resins, and silanes or/and siloxane polymers that contain one or more (meth)acryloxy functional group. In one embodiment, the UV curable silicone PSA solution is formed by first preparing (a) a reaction product of (i) a reactive siloxane polymer, with average molecular weight >100,000 g/mol; (ii) a reactive siloxane polymer, with average molecular weight <50,000 g/mol; (iii) a reactive silicone resin; and (iv) a (meth)acryloxyalkylalkoxy functional silane; and (v) a base catalyst, in an organic solvent to form a soluble and (meth)acrylic functional silicone network; and then combining with (b) a photoinitiator.

The optically clear adhesive composition can be formed into a film.

One embodiment is directed to a method of making an optically clear adhesive film comprising the steps of: (1) preparing a curable optically clear adhesive claim 1 in an organic solvent; (2) coating the curable optically clear adhesive solution onto a first release-liner; (3) evaporating the organic solvent to form a substantially solvent-free film at a temperature of about 60 to about 150° C.; and (4) laminating a second release-liner onto the substantially solvent-free film. Additionally, the method further comprises the step of (5) irradiating the substantially solvent-free film to UV light at 250-410 nm with a dosage of UVA&V 1-5 J/cm$^2$.

In another embodiment, the UV curable silicone PSA solution is formed by first preparing (a) a reaction product of (i) a reactive siloxane polymer, with average molecular weight >100,000 g/mol; (ii) a reactive siloxane polymer, with average molecular weight <50,000 g/mol; (iii) a reactive silicone resin; and (iv) a (meth)acrylo alkoxy functional silane; and (v) a base catalyst, in an organic solvent to form a soluble and (meth)acrylic functional silicone network; and then combining with (b) a (meth)acryloalkoxy terminated siloxane polymer and (c) a photoinitiator.

The adhesive film defined as an OCA film if the adhesive film exhibits an optical transmission of at least 90%, preferably >99% between quartz slides, in the 500-900 nm range, and with haze and yellowness b*<1%. The measurement of optical transmission is known to the person skilled in the art. Optical properties (T %, haze % and yellow index b*) of the cured PSA film can be measured using Cary 300 from Agilent, in accordance with ASTM E903 and ASTM D1003. The optical transmission is typically conducted on a 125 μm thick sample in accordance with ASTM E903. Preferred testing method for transmission is as follows. A small film of adhesive is placed on a 75 mm by 50 mm quartz slide that had been wiped three times with isopropanol. A second glass slide is attached onto the adhesive under a force. Then the adhesive is fully cured under a UV source. The optical transmission is measured from wavelength 300 to 900 nm. One blank 50 mm quartz slide is used as the background.

The adhesive film is formed into an electronic device by (1) preparing an optically clear adhesive film, (2) preparing a first substrate, wherein the first substrate is a front cover sheet or a back substrate of the device; (3) removing one of the release-liners; (4) laminating the optically clear adhesive film onto first substrate at a pressure of about 0.01 to about 0.5 MPa; (5) removing the other release-liner; (6) preparing a second substrate, wherein the second substrate is a front cover sheet or a back substrate of the device; and (7) laminating the optically clear adhesive film onto the second substrate at a pressure of about 0.01 to about 0.5 MPa; and/or a vacuum of about 0.01 to about 0.1 MPa, and/or at a temperature of about 30 to 80° C.

The OCA is preferred to be coated as a film and laminated between two release liners that have pressure sensitive adhesive properties. The optically clear adhesives are usually delivered as a fully cured film, as being called OCA film. The recommended cure condition is either by UV with a dosage of UV 1-5 J/cm$^2$, or upon heating at 60-150° C. The fully cured OCA film can withstand shipping and storage temperatures under stress and maintains pressure sensitivity at or below −40° C. and with minimal or zero cold flow in storage. The sheets and rolls can later be die cut into desirable sizes and shapes.

The sheets or rolls comprising the adhesive films may be produced by any suitable process. For example, the sheets may be formed by solution coating or casting. The optically clear adhesives solutions are prepared using techniques known in the art. Typically, the optically clear adhesive components are all dissolved in a solvent or a mixture of solvents e.g., xylene, toluene, heptane, hexane, cyclohexane, and the like, to form a solution. The adhesives solution in the invention have a Brookfield viscosity range of from about 100 to about 100,000 cps in the ranges of about 20-40° C., preferably about 1,000 to about 10,000 cps at 25-30° C. Such viscosity ranges allow the adhesive to be coatable into 15-250 um thickness films at ambient temperature. The viscosity is adjustable by solid % from 20 to 80%. The adhesive solution can be coated into PSA films for lab testing using the solution film applicator in lab. The coating procedure is well-known to those skilled in the art. The solution is coated as a film with a specified weight per square meter, and the solvent is then let evaporate to form the solid adhesive film. The film thickness ranges from about 0.01 mm to about 10 mm, preferably from about 0.03 to about 1 mm. The curable adhesive films remain as pressure sensitive adhesive films at or below 95° C. and with minimal cold flow in storage. The PSA film can further be UV cured with D-bulb (Fusion Systems) with a dosage of UVA&V 1-5 J/$cm^2$, or heat cured upon heating at about 60-150° C. for 5 min.

The optically clear adhesive of the invention is useful for display devices that requires optical clarity and/or touch sensory. The process of incorporating OCA in display devices can be done in several ways. In one example, the "top substrate" is a cover lens, which is optically transparent. The "base substrate" can be, for example, a display panel, or a LCD; that is forms as the base for the top substrate. The OCA film is preferably applied on the top side of the base substrate. The OCA film is typically protected between two release liners, the first liner is thinner (12-30 μm) and easier to remove, and the other is thicker (35-50 μm) and has higher release force. The OCA film, after the first liner is removed, is applied onto the top side of the base substrate by slowly pressing and laminating in one direction by a rubber roll. The second liner is removed and the top substrate is then attached to the surface of the adhesive film, preferably under vacuum condition. Vacuum conditions are preferred for a bubble-free bonding. If vacuum condition is used, then the vacuum level should preferably be less than about 0.1 MPa. If heat is applied, the preferred temperature range is between about 40 to about 80° C. In some instances, pressure is required for a bubble-free lamination, and the preferred pressure range is between about 0.1 to about 0.6 MPa.

Optically clear adhesive (OCA) is widely used in touch panels and display devices to bind the cover lens, plastic or other optical materials to the main sensor unit. OCA are used to improve the optical characteristics of the device as well as to improve other attributes such as durability and process efficiency. The OCA will bond the touch panel to the main liquid crystal display, and also bonds protective covers, such as the lens, to the touch panel. Major applications of OCA include capacitive touch panels, 3D televisions and glass retarders. The OCA film in the invention is useful in mobile phone, tablet PC, TV, notebook PC, digital camera, photo frame, car navigation, outdoor display, and the like.

In a preferred embodiment, the top substrate is selected from glass and polymer, preferably plastic films, including in particular polyethylene terephthalate, polymethyl (meth)acrylate, and/or triacetate cellulose (TAC). In another preferred embodiment, the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example, for 3D TV applications, a glass or film retarder will be bonded onto a LCD for passive 3D TV, or a TN LCD or lenticular lens is bonded a regular TFT LCD for naked eye 3D. The base substrate is a LCD module with polarizer film on top. The base substrate can be a display panel, preferably selected from a liquid crystal display, a plasma display, a light-emitting diode (LED) display, an electrophoretic display, and a cathode ray tube display.

Yet in another preferred embodiment, the display panel has touch functionality. The adhesive and the application process of the invention can be used for any touch panel sensor assembly. They can preferably be used to bond touch panel sensors that require two layers of indium-tin-oxide coated glass. They can preferably be used for cover lens bonding, and in particular, to fill the air gap in touch panel sensors that utilize a cover lens, such as clear plastic polymethyl (meth)acrylate, and the glass touch panel sensor. They can preferably be used for direct bonding, preferably to directly bond the cover lens to a LCD module. In another embodiment, the invention comprises the possibility of two or more top substrates bonded one after another onto a base substrate with the OCA between layers.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled. The following examples are provided to describe the invention in further detail. These examples, which set forth a preferred mode presently contemplated for carrying out the invention, are intended to illustrate and not to limit the invention.

EXAMPLES

The invention will be described further in the following examples, which are included for purposes of illustration and are not intended, in any way, to be limiting of the scope of the invention. In the examples which follow, unless otherwise specified, all parts are by weight and all temperatures in degree Celsius.

Temperature Sweep Test:

A TA instruments Dynamic Mechanical Analyzer Model RDA-III was used to obtain the elastic moduli (G'), loss modulus (G") and tan delta versus temperature sweep. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven was flushed continuously with nitrogen. The frequency was maintained at 10 rad/s. The initial strain at the start of the test was 0.05% (at the outer edge of the plates). An auto strain option in the software was used to maintain an accurately measurable torque throughout the test. The option was configured such that the maximum applied strain allowed by the software was 80%. The auto strain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") are calculated by the software from the torque and strain data. Their ratio, G"/G', also known as the tan delta, was also calculated.

T-Peel Test:

T-peel adhesion test was performed on Instron Sintech 1/D, in accordance with ASTM D1876. The procedure was as follows: (1) transfer adhesive films to between two 2-3 mil PET films; (2) UV cure the laminated adhesive with D-bulb (Fusion Systems) with a dosage of UVA&V 1-5 J/cm$^2$; (3) cut specimens to 1.0 in wide×6-12 in long strips; (4) condition at 23° C. and 50% relative humidity for 12 hr; (5) perform the T-peel adhesion at 23° C. and 50% relative humidity: clamp each ends of the t-peel specimen in separate test grips of the Instron at a rate of 12.0 in/min) length of the bond line.

Transmission Test:

Optical properties (T %, haze % and yellow index b*) were measured by using Cary 300 from Agilent, in accordance with ASTM E903 and ASTM D1003. Preferred testing method for transmission was as follows: (1) place a small film of adhesive on a 75 mm by 50 mm quartz slide, that had been wiped three times with isopropanol; (2) attach a second quartz slide onto the adhesive under a force; (3) cure the adhesive with a D-bulb (Fusion Systems) at UVA&V 1-5 J/cm$^2$; and measure the optical transmission from 300 to 900 nm with the spectrometer.

Components to the Examples are as follows:

OPPANOL B15 and N50 are polyisobutylenes, available from BASF.

SR262, CN308 are reactive diacrylates, available from Sartomer.

Irgacure TPO and TPO-L are curing agents, available from BASF.

SEPTON 4033 is a SEEPS triblock copolymer from Kuraray.

Indopol H1500 is oil, available from Ineos USA LLC.

Risella 430 oil is available from Shell Oil.

Elastomer 350N (Mn 350,000 g/mol) is a siloxane polymer from Wacker.

Pt, S27, vinyltrimethoxysilane, HMS301, methacryloxypropyltrimethoxysilane are available from Gelest.

PDMS-MA is methacryloxypropyldimethoxy terminated polydimethylsiloxane (Mn 40,000 g/mol) is available from Henkel.

MQ is a hydroxy functional silicone resin (Mn ~8000 g/mol), available from Gelest or Momentive.

Heptane and n-butyl lithium (1.6M in hexane) (nBuLi) are available from Aldrich.

Example 1: PIB Pressure Sensitive Adhesive

UV curable PIB pressure sensitive adhesives (PSA) was made by mixing all the components in Table 1 in a one-gallon can at room temperature for 24 hours to make Example 1.

TABLE 1

PIB PSA

| Components | grams |
| --- | --- |
| Oppanol B30 | 270.1 |
| Indopol H1500 | 135 |
| SR 262 | 39.3 |
| TPO | 1.0 |
| Resilla 430X | 4.6 |
| Heptane (solvent) | 550 |
| Total | 1000 |
| % solids | 45.00 |

Various UV absorbers were added to the PBI PSA of Example 1 to make Samples 1-5. The added UV absorbers are listed in Table 2. Properties, including the T-peel, modulus and UV-vis transmission below 400 nm are also reported in Table 2 for Samples 1-5.

TABLE 2

Addition of UV Absorbers in PIB PSA

| Samples | 1 (C)* | 2 (C) | 3 (C) | 4 (C) | 5 |
| --- | --- | --- | --- | --- | --- |
| Example 1, g | 100 | 99.55 | 97.75 | 99.55 | 97.75 |
| Tinuvin-928, g | 0 | 0.45 | 1.8 | 0 | 0.45 |
| BLS-531or Chimassorb-81 g | 0 | 0 | 0 | 0 | 1.35 |
| Tinuvin 770, g | 0 | 0 | 0.45 | 0.45 | 0.45 |
| Properties | | | | | |
| 12" T-Peel (PET/PET), ozf/in | 67 | 62 | 54 | 35 | 68 |
| G', dyne/cm$^2$ at 25° C. | 1.6 × 10$^6$ | 1.38 × 10$^6$ | 1.6 × 10$^6$ | 2 × 10$^6$ | 1.3 × 10$^6$ |
| UV-VIS % Transmit below 400 nm | 100% | <43% | <9% | 100% | <1% |

*(C) indicates comparative samples

Figure 1:
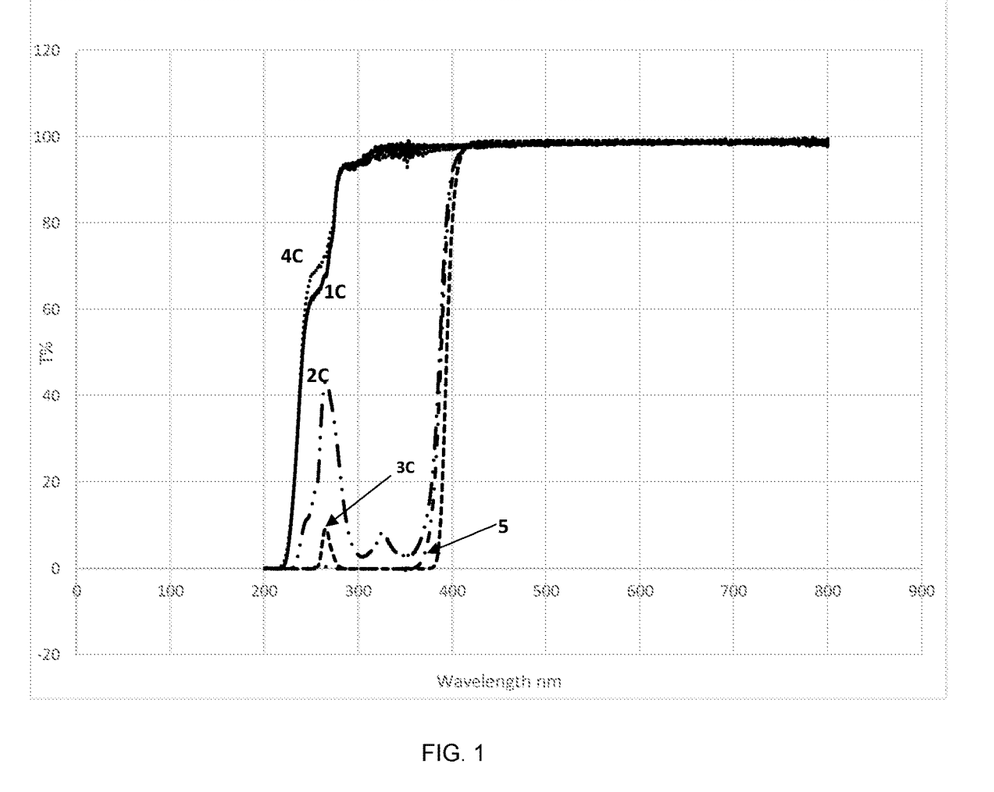
FIG. 1 is a UV-vis spectra of a polyisobutylene-based pressure sensitive adhesive with and without UV absorbers.

UV-vis spectra of Samples 1-5 were run and are shown in FIG. 1. Samples 1-4 had absorbencies (peaks) below 400 nm. Sample 5 with the UV absorber package, had the least absorbencies in the same range. Sample 3, while is the right most curve, has a distinct peak at 270 nm; whereas sample 5 has zero distinct peaks from 230-370 nm.

Example 2: SBC Pressure Sensitive Adhesive

The styrene-butadiene copolymer (SBC) PSA was made by mixing all the components in Table 3 in a one gallon can at room temperature for 24 hours to make Example 2.

TABLE 3

| SBC PSA Components in | |
|---|---|
| Components | grams |
| SEPTON 4033 | 9.9 |
| Risella 430X | 6.6 |
| ESCOREZ 5380 | 66.1 |
| CN308 | 16.5 |
| TPOL | 0.8 |
| Total | 100 |

UV absorbers were added to the SBC PSA of Example 2. The added UV absorbers are listed in Table 4 for Sample 6-7. Properties, including the T-peel, modulus and UV-vis transmission below 400 nm are also reported in Table 4 in Samples 6-7.

TABLE 4

Comparison of UV Absorbers in SBC PSA

| Samples | 6 (C) R10-L | 7 R10-L |
|---|---|---|
| Example 2 | 100% | 97.75% |
| Tinuvin-928 | 0 | 1 |
| BLS-531 | 0 | 3 |
| Tinuvin 770 | 0 | 1 |
| T-Peel (PET/PET), ozf/in | 7.6 | 29 |
| G', dyne/cm$^2$, 25° C. | 1.27 × 10$^6$ | 1.9 × 10$^5$ |
| UV-VIS % Transmit below 400 nm | <80% | <20% |

Figure 2:
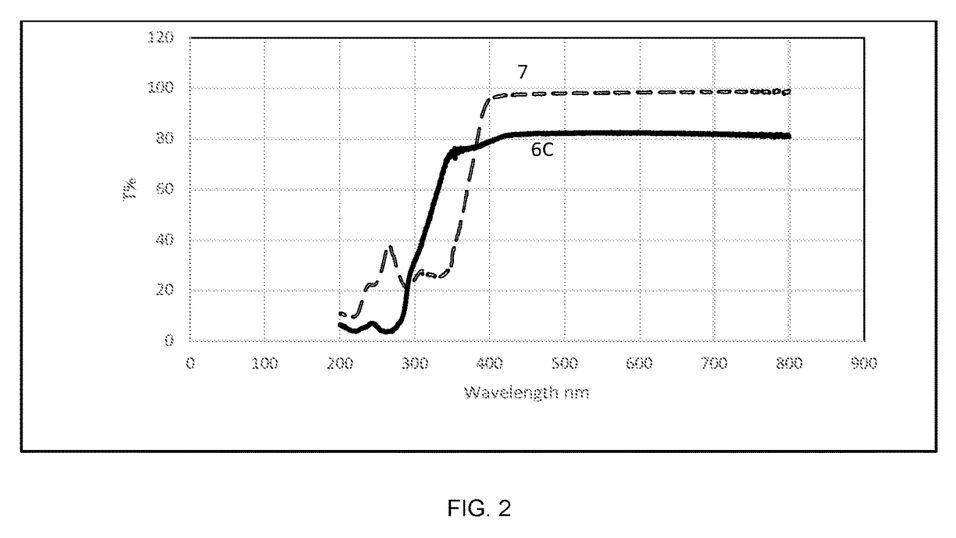
FIG. 2 is a UV-vis spectra of a styrene butadiene block copolymer-based pressure sensitive adhesive with and without UV absorbers.

UV-vis spectra of Samples 6 and 7 were run and are shown in FIG. 2. Sample 6 had far greater absorbencies (peaks) than Sample 7 with UV absorber package at wavelengths below 400 nm.

Example 3. Acrylic Pressure Sensitive Adhesive

The acrylic PSA, Example 3, was made by mixing acrylic acid (0.5 g), 2-EHA (43.5 g), 4-HBA (6.0 g) and GMA (6.0 g) in acetone (50 g) in a three-neck 500 mL flask. The mixture was refluxed at acetone temperature for 15 min under nitrogen gas. Azo-64 (0.015 g) was added to the mixture and the reflux continued for one additional hour. Acetone (20 g) solution of Azo-64 (0.015 g) was added in a dropwise manner for over 2 hours, and continued to mix for another 2 hours. The reaction product was discharged into a glass jar and the solid was adjusted to 50% solids.

UV absorbers were added to the acrylic PSA of Example 3 and mixture for 24 hours to form Sample 8-9. The added UV absorbers are listed in Table 5. Properties, including the T-peel, modulus and UV-vis transmission below 400 nm are also reported in Table 5 for Sample 8-9.

TABLE 5

| Samples | 8 (C) | 9 |
|---|---|---|
| Example 3 | 100% | 97.75% |
| Tinuvin-928 | 0 | 1 |
| BLS-531 | 0 | 3 |
| Tinuvin 770 | 0 | 1 |
| T-Peel (PET/PET), ozf/in | 54.9 | 23 |
| G', dyne/cm$^2$, 25° C. | 2.39 × 10$^5$ | 2.4 × 10$^5$ |
| UV-VIS % Transmit below 400 nm | <100% | <10% |

Figure 3:
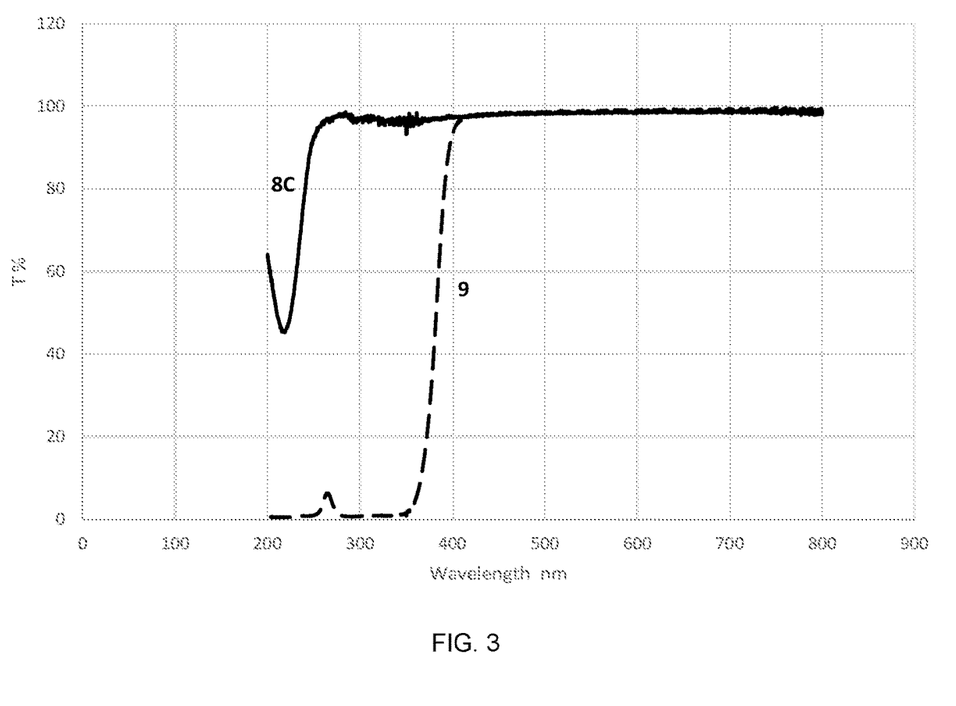
FIG. 3 is a UV-vis spectra of a polyacrylate-based pressure sensitive adhesive with and without UV absorbers.

UV-vis spectra of Samples 8 and 9 were run and are shown in FIG. 3. Sample 8 had far greater absorbencies (peaks) than Sample 9 with UV absorber package at wavelengths below 400 nm.

Example 4. UV-Curable Silicone Optically Clear Adhesive

The UV-curable silicone adhesive of Example 4 was made by forming a mixture of silicone polymer (Wacker Elastomer 350N, 5 g), silicone MQ resin (25 g), PDMS-MA (20 g), methacryloxypropyltrimethoxysilane (0.3 g), and heptane (50 g) was stirred at reflux under argon. Reaction catalyst nBuLi (0.2 mL, 1.6M in hexane) and then mixed about 2 hr, as shown in Table 6. The reaction mixture was purged with $CO_2$ for 1 hour at reflux and then the product was cooled to room temperature. TPOL (0.1 g) was added. The product was mixed for 15 m in and packed in a glass jar.

UV absorbers were added to the UV curable silicone adhesive of Example 4 to make Samples 10-11. The added UV absorbers are listed in Table 6. Properties, including the T-peel, modulus and UV-vis transmission below 400 nm are also reported in Table 6 of Samples 10 and 11.

TABLE 6

| Samples | 10 (C) | 11 |
|---|---|---|
| Example 4 | 100% | 97.75% |
| Tinuvin-928 | 0 | 1 |
| BLS-531 | 0 | 3 |
| Tinuvin 770 | 0 | 1 |
| T-Peel (PET/PET), ozff/in | 9.7 | 4.5 |
| G', dyne/cm$^2$, 25° C. | 5.7 × 10$^5$ | 5.7 × 10$^5$ |
| UV-VIS % Transmit below 400 nm | <100% | <15% |

Figure 4:
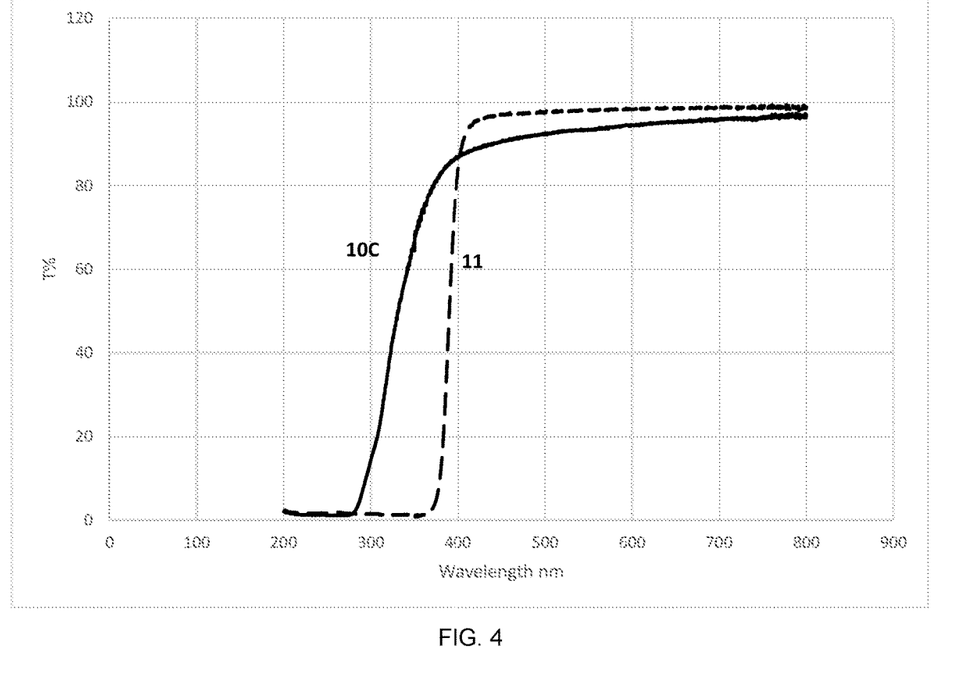
FIG. 4 is a UV-vis spectra of a UV-curable silicone-based pressure sensitive adhesive with and without UV absorbers.

UV-vis spectra of Samples 10 and 11 were run and are shown in FIG. 4. Sample 10 had far greater absorbencies (peaks) than Sample 11 with UV absorber package at wavelengths below 400 nm.

Example 5. Thermally Curable Silicone Optically Clear Adhesive

The thermal curable silicone adhesive of Example 5 was made by forming a mixture of silicone polymer (Wacker Elastomer 350N, 24 g), silicone MQ resin (24 g), vinyltrimethoxysilane (2.0 g), and heptane (50 g), and the mixture was stirred at reflux under argon. Reaction catalyst nBuLi (0.2 mL, 1.6M in hexane) was added and was stirred at reflux under argon for about 2 hr. The reaction mixture was purged with $CO_2$ for 1 hour at reflux and then the product was cooled to room temperature. Pt (0) (500 ppm) and silicone crosslinker HMS301 were added. The product was mixed for 15 min and then packed in a glass jar.

UV absorber package was added to the thermal curable silicone adhesive of Example 5 to make Samples 12-13. The added UV absorbers are listed in Table 7. Properties, including the T-peel, modulus and UV-vis transmission below 400 nm are also reported in Table 7 of Samples 12-13.

TABLE 7

| Examples | 12 (C) P54-10 | 13 P54-10 |
|---|---|---|
| Example 5 | 100% | 97.75% |
| Tinuvin-928 | 0 | 1 |
| BLS-531 | 0 | 3 |
| Tinuvin 770 | 0 | 1 |
| T-Peel (PET/PET), ozf/in | 19.1 | 9.53 |
| G', dyne/cm$^2$, 25° C. | 2 × 10$^6$ | 2.2 × 10$^6$ |
| UV-VIS % Transmit below 400 nm | <80% | 0% |

Figure 5:
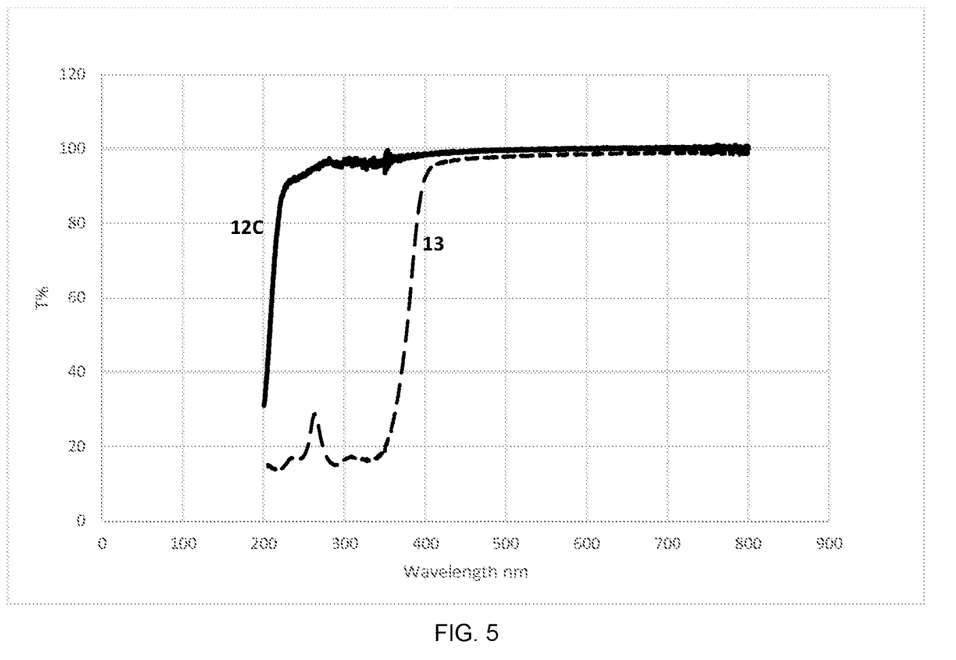
FIG. 5 is a UV-vis spectra of a thermally-curable silicone-based pressure sensitive adhesive with and without UV absorbers.

UV-vis spectra of Samples 12 and 13 were run and are shown in FIG. 5. Sample 12 had far greater absorbencies (peaks) than Sample 13 with UV absorber package at wavelengths below 400 nm.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. An optically clear adhesive composition comprising:
   (a) about 85 to about 99.7% of a thermal curable silicone pressure sensitive adhesive comprising:
      (i) about 94.5% to about 99.998% vinyl functional silicone;
      (ii) about 0.001 to about 5% of a hydride functional siloxane polymer or oligomer; and
      (iii) about 0.001 to about 0.5% of a Pt catalyst; and
   (b) about 0.3-15% of a mixture of UV absorbers comprising:
      (i) about 0.1 to about 5% hydroxyphenyl benzotriazole or its derivatives;
      (ii) about 0.1 to 5% % benzophenone or its derivatives; and
      (iii) about 0.1-5% % hindered amine light stabilizer
   wherein the optically clear adhesive composition has a percent transmittance (% T) of less than 10% at less than 380 nm and greater than 90% at greater than 410 nm, measured in accordance with ASTM E903.

2. The optically clear adhesive composition of claim 1, wherein the (a) thermal curable silicone pressure sensitive adhesive composition comprises:
   (i) the vinyl functional silicone is a mixture and/or a reaction product of polydimethylsiloxane polymers, silicone resins, and silanes that contain one or more vinyl functional group,
   (ii) the hydride functional siloxane polymer (ii) is a polydimethylsiloxane polymer or oligomer with terminal functional groups of SiMe$_2$H, or with pedant functional groups of SiMeH, or mixtures thereof, and the average weight molecular weight of from about 400 to 100,000 g/mol, and
   (iii) the Pt catalyst is Speier's catalyst H$_2$PtCl$_6$, Karstedt's catalyst, or alkene-stabilized platinum (0).

3. An optically clear adhesive composition comprising:
   (a) about 85 to about 99.7% a UV curable silicone pressure sensitive adhesive, comprising:
      (i) about 99.5% to about 99.999% (meth)acryloxy functional silicone and
      (ii) about 0.001 to about 0.5% of a photoinitiator catalyst and
   (b) about 0.3-15% of a mixture of UV absorbers comprising:
      (i) about 0.1 to about 5% hydroxyphenyl benzotriazole or its derivatives;
      (ii) about 0.1 to 5% % benzophenone or its derivatives; and
      (iii) about 0.1-5% % hindered amine light stabilizer
   wherein the optically clear adhesive composition has a percent transmittance (% T) of less than 10% at less than 380 nm and greater than 90% at greater than 410 nm, measured in accordance with ASTM E903.

4. The optically clear adhesive composition of claim 2, wherein the (meth)acryloxy functional silicone is a mixture and/or a reaction product of polydimethylsiloxane polymers, silicone resins, and silanes or/and siloxane polymers that contain one or more (meth)acryloxy functional group.

5. An optically clear adhesive composition comprising:
   (a) about 85 to about 99.7% of a UV curable polyisobutylene-based pressure sensitive adhesive composition comprising:
      (i) about 1 to about 30% of a (meth)acrylate monomer, a (meth)acrylate oligomer or mixtures thereof;
      (ii) about 10 to about 90% a polyisobutylene polymer
      (iii) about 5% to about 50% a liquid diluent, a tackifier, or mixtures thereo; and
      (iv) about 0.001 to 5% a photoinitiator and
   (b) about 0.3-15% of a mixture of UV absorbers comprising:
      (i) about 0.1 to about 5% hydroxyphenyl benzotriazole or its derivatives;
      (ii) about 0.1 to 5% benzophenone or its derivatives; and
      (iii) about 0.1-5% % hindered amine light stabilizer
   wherein the optically clear adhesive composition has a percent transmittance (% T) of less than 10% at less than 380 nm and greater than 90% at greater than 410 nm, measured in accordance with ASTM E903.

6. The optically clear adhesive composition of claim 5,
   (i) wherein the (meth)acrylate monomer is a mono or multifunctional (meth)acrylic monomers,
   (ii) wherein the (meth)acrylate oligomer is a (meth)acrylic functionalized polyisobutylene, polybutadiene, hydrogenated polybutadiene, or a polyolefin having greater than one (meth)acrylic functional group per molecule, wherein the reactive functional group is selected from the group consisting of terminal methacrylates, pendant methacrylates, terminal acrylates, and/or pendant acrylates; and mixtures thereof, wherein the (meth)acrylate oligomer or mixtures thereof have a weight average molecular weight (Mw) of from about 1000 to about 95,000 g/mol, and
   (iii) the liquid diluent is mineral oil, a wax, polyisobutylene, polybutene, or a synthetic liquid polymer.

7. An optically clear adhesive composition comprising:
   (a) about 85 to about 99.7% of a UV curable styrenic block copolymer-based pressure sensitive adhesive comprising:
      (i) about 5% to about 30% of a (meth)acrylate monomer, or a (meth)acrylate oligomer, or mixtures thereof;
      (ii) about 5% to about 30% a styrenic block copolymer having fully hydrogenated and saturated soft blocks;
      (iii) about 55% to about 79.99% a liquid diluent, a tackifier, or mixtures thereof; and
      (iv) about 0.01% to about 5% a photoinitiator; and (b) about 0.3-15% of a mixture of UV absorbers comprising:
 (i) about 0.1 to about 5% hydroxyphenyl benzotriazole or its derivatives;
 (ii) about 0.1 to 5% % benzophenone or its derivatives; and
 (iii) about 0.1-5% % hindered amine light stabilizer;
wherein the optically clear adhesive composition has a percent transmittance (% T) of less than 10% at less than 380 nm and greater than 90% at greater than 410 nm, measured in accordance with ASTM E903.

8. The optically clear adhesive composition of claim 7, wherein the styrenic block copolymer is fully hydrogenated, having saturated soft blocks, wherein the soft block are selected from the groups consisting of ethylene, propylene, butylene, isobutylene, ethylene-propylene, ethylene-butylene, and mixtures thereof.

9. The optically clear adhesive composition of claim 8, wherein the styrenic block copolymer is a triblock, a diblock, or mixtures thereof.

10. An article comprising the optically clear adhesive composition of claim 1.

11. A method of making an optically clear adhesive film comprising the steps of:
 (1) preparing a curable optically clear adhesive claim 1 in an organic solvent;
 (2) coating the curable optically clear adhesive solution onto a first release-liner;
 (3) evaporating the organic solvent to form a substantially solvent-free film at a temperature of about 60 to about 150° C.; and
 (4) laminating a second release-liner onto the substantially solvent-free film.

12. The method of making the optically clear adhesive film of claim 11, further comprising the step of:
 (5) irradiating the substantially solvent-free film to UV light at 250-410 nm with a dosage of UVA&V 1-5 $J/cm^2$.

13. An article comprising the optically clear adhesive composition of claim 2.

14. An article comprising the optically clear adhesive composition of claim 3.

15. An article comprising the optically clear adhesive composition of claim 5.

* * * * *

UNITED STATES PATENT AND TRADEMARK OFFICE
CERTIFICATE OF CORRECTION

PATENT NO. : 11,427,739 B2  
APPLICATION NO. : 16/913607  
DATED : August 30, 2022  
INVENTOR(S) : Geetanjaliben Shah and Yuxia Liu

Page 1 of 1

It is certified that error appears in the above-identified patent and that said Letters Patent is hereby corrected as shown below:

In the Claims

Column 21, Line 62 Claim 3, change "99.7 % a UV curable silicone" to --99.7 % of a UV curable silicone--.

Signed and Sealed this  
Fourth Day of April, 2023

Katherine Kelly Vidal  
*Director of the United States Patent and Trademark Office*